(12) United States Patent
Beach et al.

(10) Patent No.: US 7,855,553 B2
(45) Date of Patent: Dec. 21, 2010

(54) TEST COMPONENTS FABRICATED WITH LARGE AREA SENSORS USED FOR DETERMINING THE RESISTANCE OF AN MR SENSOR

(75) Inventors: Robert S. Beach, Los Gatos, CA (US); Mary K. Gutberlet, Salinas, CA (US); David J. Seagle, Morgan Hill, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 377 days.

(21) Appl. No.: 11/965,587

(22) Filed: Dec. 27, 2007

(65) Prior Publication Data

US 2009/0168215 A1 Jul. 2, 2009

(51) Int. Cl.
*G01R 33/12* (2006.01)
(52) U.S. Cl. .................................................. 324/210
(58) Field of Classification Search .............. 324/210, 324/211, 212
See application file for complete search history.

(56) References Cited

U.S. PATENT DOCUMENTS

| | | | |
|---|---|---|---|
| 5,514,953 | A | 5/1996 | Schultz et al. |
| 6,515,475 | B2 * | 2/2003 | Goubau et al. ............. 324/210 |
| 6,642,713 | B2 | 11/2003 | Diederich |
| 6,680,832 | B2 | 1/2004 | Fontana, Jr. et al. |
| 6,731,110 | B2 | 5/2004 | Church |
| 6,779,249 | B2 | 8/2004 | Santini |
| 7,036,208 | B2 | 5/2006 | Ho et al. |
| 7,227,728 | B2 | 6/2007 | Lin |
| 2006/0023376 | A1 | 2/2006 | Gill |
| 2007/0047155 | A1 | 3/2007 | Carey et al. |

OTHER PUBLICATIONS

"Magnetic Nanostructures and Heterostructures VIII: Co_90Fe_10/Cu in the Current Perpendicular to the Plane (CPP) Geometry", Session )22, http://flux.aps.org/meetings/YR98/BAPSMAR98/abs/S2990.html.

Han et al., "Fabrication of sub-50 nm current-perpendicular-to-plane spin valve sensors", Thin Solid Films, vol. 505, Issues 1-2, pp. 41-44 (2006).

Nakamoto et al., "CPP-GMR Reader and Wraparound shield Writer for Perpendicular Recording", IEEE Transactions on Magnetics, vol. 41, No. 10, pp. 2914-2919 (Oct. 2005).

(Continued)

*Primary Examiner*—Kenneth J Whittington
(74) *Attorney, Agent, or Firm*—Duft Bornsen & Fishman, LLP

(57) ABSTRACT

Test methods and components are disclosed for testing resistances of magnetoresistance (MR) sensors in read elements. Test components are fabricated on a wafer with a first test lead, a test MR sensor, and a second test lead. The test leads and test MR sensor are fabricated with similar processes as first shields, MR sensors, and second shields of read elements on tie wafer. However, the test MR sensor is fabricated with an area that is larger than areas of the MR sensors in the read elements. The larger area of the test MR sensor causes the resistance of the test MR sensor to be insignificant compared to the lead resistance. Thus, a resistance measurement of the test component represents the lead resistance of a read element. An accurate resistance measurement of an MR sensor in a read element may then be determined by subtracting the lead resistance.

9 Claims, 10 Drawing Sheets

OTHER PUBLICATIONS

Hatatani et al., "Medium SNR and Sharpness of Micro-Track Profile of CPP-Type Head With an Arbitrary Magnetic Shield Shape", IEEE Transactions on Magnetics, vol. 43, No. 6, pp. 2202-2204 (Jun. 2007).

Seigler et al., "Current-Perpendicular-to-Plane Multilayer Sensors for Magnetic Recording", IEEE Transactions on Magnetics, vol. 39, No. 3, pp. 1855-1858 (May 2003).

* cited by examiner

TEST COMPONENTS FABRICATED WITH LARGE AREA SENSORS USED FOR DETERMINING THE RESISTANCE OF AN MR SENSOR

BACKGROUND OF THE INVENTION

1. Field of the Invention

The invention is related to the field of wafer fabrication and, in particular, to testing the resistance of a magnetoresistance (MR) sensor of a read element independent of the resistance of the leads of the read element using test components. More particularly, the test components are fabricated with an MR sensor having an area at least an order of magnitude larger than the area of a typical MR sensor.

2. Statement of the Problem

Wafer fabrication is a procedure comprised of many repeated sequential processes to produce electrical circuits, devices, components, etc. One type of device formed through wafer fabrication is magnetic recording heads. Magnetic recording heads (sometimes referred to as sliders) are used to write to magnetic recording disks and to read from magnetic recording disks, such as in a hard disk drive. Magnetic recording heads typically include a read element and a write element. The structure of a read element includes a first shield and a second shield with a magnetoresistance (MR) sensor formed between the shields. The MR sensor may comprise a Giant MR (GMR) sensor, a Tunneling MR (TMR) sensor, or another type of MR sensor. If the read element is being operated in a current perpendicular to plane (CPP) fashion, then the first shield and the second shield are electrically connected to opposing surfaces of the MR sensor to act as current leads for a sense current that is injected perpendicularly through the MR sensor.

Recording head fabricators take a variety of measurements during wafer fabrication of recording heads to verify that the fabrication processes are being properly performed. For read elements, there are two parameters that are of particular interest. One of the parameters is magnetoresistance (dr/R), and the other parameter is the area resistance (RA) of the MR sensor.

Magnetoresistance (dr/R) indicates the change in resistance of a material or materials due to an external magnetic field. Magnetoresistance of a CPP MR sensor is typically measured by injecting a test current into the sensor through the leads of the MR sensor. In a CPP MR sensor, the leads are usually the shields abutting the MR sensor. A voltage is then measured to determine the resistance of the MR sensor. An external magnetic field is then applied, and is varied from a strong negative value to a strong positive value. The external magnetic field changes the resistance of the MR sensor. Thus, the resistance of the MR sensor is measured as the magnetic field changes to generate a transfer curve. The transfer curve indicates the maximum resistance measured in the MR sensor, and also indicates the minimum resistance measured in the MR sensor. The magnetoresistance (dr/R) of the MR sensor may then be determined according to the following equation: $dr/R = (R_{max} - R_{min})/R_{min}$.

Area resistance (RA) is an intrinsic property of thin-film materials that describes the resistance area product (ohms-$micron^2$). The RA of an MR sensor is the product of the resistance of the MR sensor and the area of the MR sensor. The RA also depends on the direction of any external magnetic fields. Recording head fabricators know the area of an MR sensor, and are able to measure the resistance of the MR sensor as described above. Thus, recording head fabricators are able to determine the RA of the MR element.

One problem encountered when measuring the resistance of an MR sensor is that the resistance measurement represents the combined resistance of the MR sensor and the leads (e.g., the shields). The leads may contribute significantly to the measured resistance. For example, a typical resistance measurement of an MR sensor may be 10 ohms, with the lead resistance being about 3 ohms. Thus, the leads may contribute 30% or more to the overall measured resistance of an MR sensor. Unfortunately, recording head fabricators are not able to obtain accurate resistance measurements of the MR sensor individually. As a result, the magnetoresistance (dr/R) transfer curves and the RA measurements will not accurately depict the individual resistance of the MR sensor.

Another problem encountered when measuring the resistance of an MR sensor is that the leads are themselves magnetic. As previously stated, the shields of a read element many times act as the leads to the MR sensor. Shields are typically formed from NiFe, which is a magnetic material. The leads thus have their own magnetoresistance (dr/R) properties. The magnetoresistance (dr/R) of the leads thus disturb the transfer curves that are generated for MR sensors.

SUMMARY OF THE SOLUTION

Embodiments of the invention solve the above and other related problems with test components that are fabricated on a wafer along with the magnetic recording heads. The test components are fabricated so that the resistance of the leads of a read element may be measured independent of the resistance of the MR sensor of the read element. When the resistance of the leads is known, a total resistance of a read element (leads and MR sensor) may then be measured. The resistance of the MR sensor may then be determined based on the total resistance of the read element and the resistance of the leads. Recording head fabricators may advantageously determine the resistance of the MR sensor independent of the resistance of the leads. Thus, the magnetoresistance (dr/R) and area resistance (RA) for the MR sensor may be measured more accurately.

One embodiment of the invention comprises a method of fabricating a test component on a wafer. For the method, a first test lead for the test component is formed. The first test lead may be formed in the same or similar fabrication processes as the first shield of a read element on the wafer. A test MR sensor is then formed in electrical contact with the first test lead. The test MR sensor in the test component may be formed in the same or similar fabrication processes as the MR sensor of a read element on the wafer, and thus resembles the MR sensor of the read element except that the area of the test MR sensor in the test component is at least an order of magnitude larger (i.e., at least ten times larger) than the area of the MR sensor in the read element. A second test lead is then formed in electrical contact with the test MR sensor. The larger area of the test MR sensor in the test component results in a resistance in the test MR sensor that is insignificant compared to the resistances of the first test lead and the second test lead.

Another embodiment of the invention comprises a method of determining resistances of MR sensors formed in read elements of magnetic recording heads on a wafer. For the method, a test component is fabricated on a wafer along with magnetic recording heads, such as described in the prior embodiment. A resistance of the test component is then measured. A total resistance of a read element that is fabricated on wafer is also measured. With these measurements, the resistance of an MR sensor in the read element may be determined based on the resistance of the test component, and based on the total resistance of the read element. Because the resistance of the test MR sensor in the test component is insignificant due to the large area of the test MR sensor, the resistance measurement of the test component represents the resistance of the first test lead and the second test lead. The total resistance measurement of the read element represents the resistance of the first shield, the resistance of the MR sensor in the read element, and the resistance of second shield. Because the test leads in the test component are fabricated in the same manner as the shields in the read element, it may be assumed that their resistances are about equal and that the resistance of the test component is approximately equal to the combined resistance of the shields of the read element. As a result, the resistance of the MR element of the read element may be determined by subtracting the resistance of the test component from the total resistance of the read element.

The invention may include other exemplary embodiments described below.

DESCRIPTION OF THE DRAWINGS

The same reference number represents the same element or same type of element on all drawings.

FIG. 28 is a cross-sectional view of the read element with the second photoresist removed.

DETAILED DESCRIPTION OF THE INVENTION

FIGS. 1-30 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
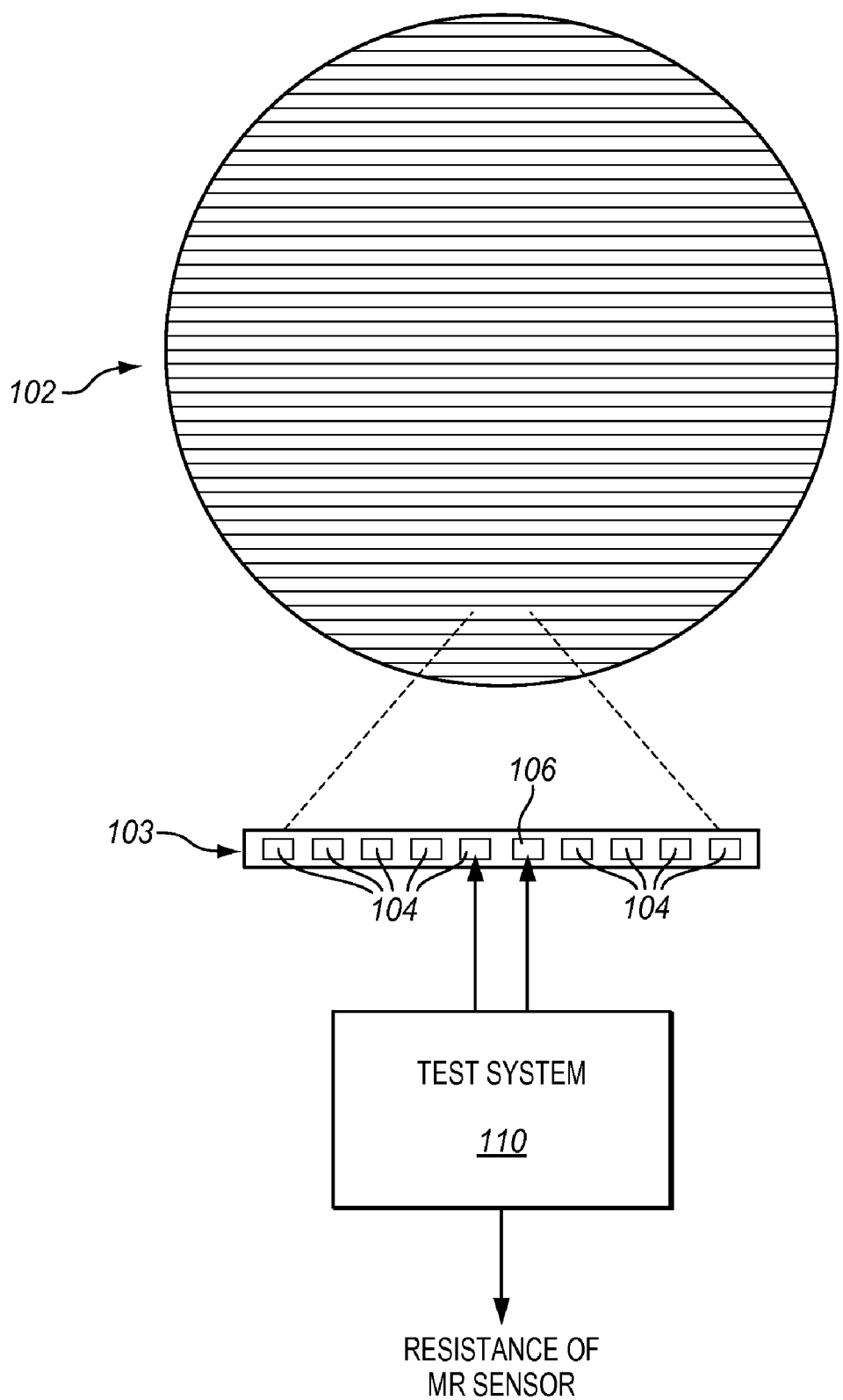
FIG. 1 illustrates a wafer in an exemplary embodiment of the invention.

FIG. 1 illustrates a wafer 102 in an exemplary embodiment of the invention. Wafer 102 comprises a plurality of rows of components, which are illustrated by the horizontal lines across wafer 102. Reference number 103 illustrates a magnified view of a portion of a row on wafer 102. This row on wafer 102 includes a plurality of magnetic recording heads 104 that are fabricated with functional read elements. A functional read element as provided herein is an actual read element that will be used to read from a magnetic recording media, such as a hard disk drive. A functional read element includes a first shield (i.e., first lead), an MR sensor, and a second shield (i.e., second lead), among other layers. This row on wafer 102 also includes one or more test components 106.

A test component comprises a component fabricated on the wafer in order to measure/test the resistance of an MR sensor in a read element. Although one test component 106 is illustrated in FIG. 1, wafer 102 may be populated with multiple test components 106. Test components 106 may be staggered throughout wafer 102 in order to provide a sampling of read elements in different positions on wafer 102. Test component 106 is configured so that a test system 110 is able to measure resistances of test components 106. Test system 110 is also able to measure resistances of read elements as fabricated in magnetic recording heads 104.

Figure 2:
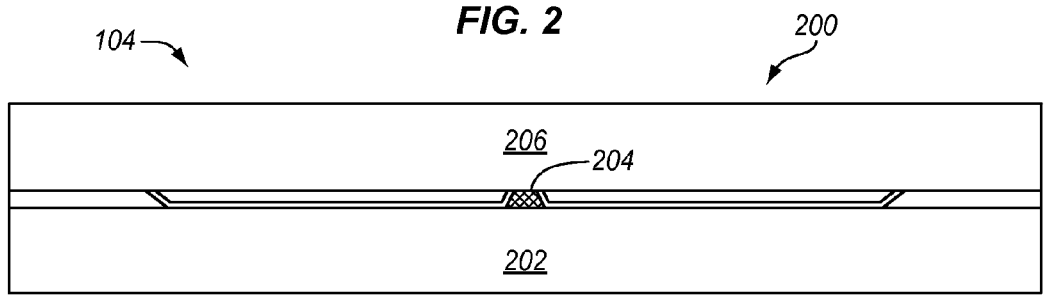
FIG. 2 is a cross-sectional view illustrating a typical read element fabricated in a magnetic recording head.

FIG. 2 is a cross-sectional view illustrating a typical read element 200 fabricated in a magnetic recording head 104. Read element 200 includes a first shield 202, an MR sensor 204, and a second shield 206. Read element 200 further includes other layers on side regions of MR sensor 204 which are illustrated but irrelevant to this discussion, such as insulation layers, hard bias layers, etc. Read element 200 is being operated in a current perpendicular to plane (CPP) fashion, so first shield 202 comprises a first lead for read element 200 and second shield 206 comprises a second lead for read element 200. MR sensor 204 may comprise a CPP GMR sensor, a TMR sensor, or another type of MR sensor being operated in a CPP mode.

After a read element 200 is fabricated, it is common for recording head fabricators to test the resistance of read element 200. The resistance measurement is taken across first shield 202 and second shield 206, such as by injecting a current into second shield 206 and measuring a voltage across the shields 202 and 206. For the resistance measurement, the resistance of second shield 206, the resistance of MR sensor 204, and the resistance of first shield 202 each contribute to the total resistance of read element 200. It would be desirable to measure the resistance of MR sensor 204 independent of the resistance of second shield 206 and the resistance of first shield 202, which is not possible in read element 200. Thus, test component 106 is used so that the resistance of an MR sensor may be determined independent of the resistance of second shield 206 and the resistance of first shield 202.

Figure 3:
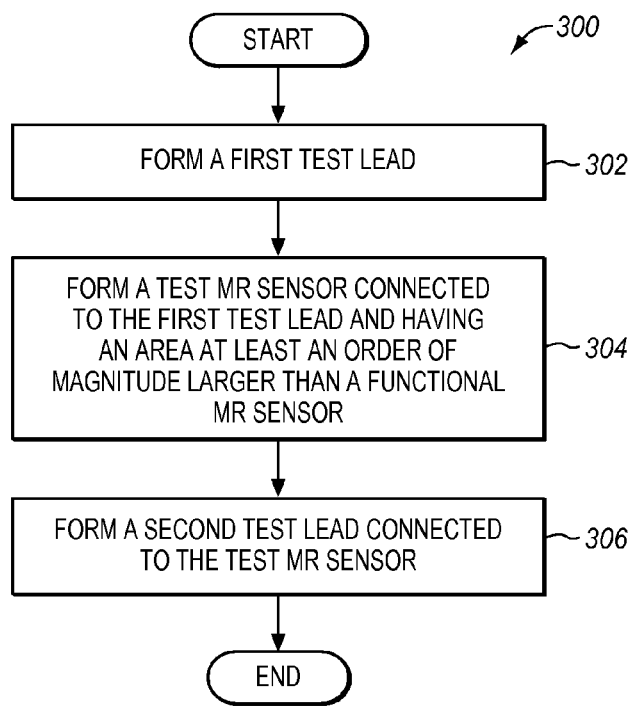
FIG. 3 is a flow chart illustrating a method of fabricating a test component on a wafer in an exemplary embodiment of the invention.

FIG. 3 is a flow chart illustrating a method 300 of fabricating test components 106 on wafer 102 in an exemplary embodiment of the invention. The steps of the flow chart in FIG. 3 are not all inclusive and may include other steps not shown. FIG. 3 illustrates a basic method, as a more detailed method of fabrication is provided in FIG. 6.

Figure 4:
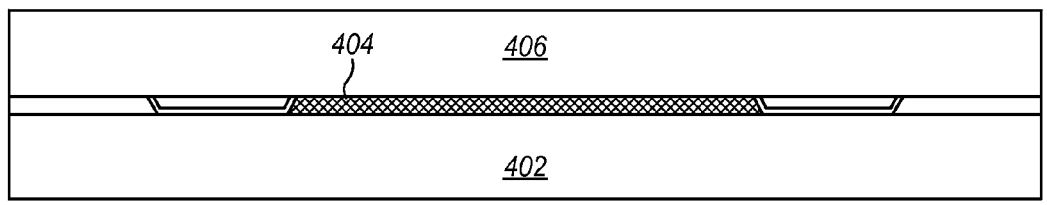
FIG. 4 is a cross-sectional view illustrating a test component fabricated according to the method of FIG. 3 in an exemplary embodiment of the invention.

Step 302 comprises forming a first test lead for test component 106. FIG. 4 is a cross-sectional view illustrating a test component 106 fabricated according to method 300. Test component 106 includes a first test lead 402 as formed in step 302. As with a functional read element 200 (see FIG. 2), first test lead 402 may comprise a shield of a read element.

Step 304 of FIG. 3 comprises forming a test MR sensor 404 in electrical contact with first test lead 402 (see also FIG. 4). MR sensor 404 resembles the MR sensor 202 in FIG. 2, except that the area of test MR sensor 404 is at least an order of magnitude larger (i.e., the nearest power of ten) than the area of MR sensor 202 in FIG. 2. For instance, the area of test MR sensor 404 may be at least 10 times larger, 100 times larger, etc, than the area of MR sensor 202 in FIG. 2. The area of test MR sensor 404 is based on the dimensions that are parallel to wafer 102, which are left to right in FIG. 4 and into and out of the page in FIG. 4. The dimension which is up and down in FIG. 4 is not considered.

Step 306 of FIG. 3 comprises forming a second test lead 406 for test component 106 (see also FIG. 4). Second test lead 406 is in electrical contact with test MR sensor 404. As with a functional read element 200 (see FIG. 2), second test lead 406 may comprise a shield of a read element. When test component 106 is fabricated as shown in FIG. 4, recording head fabricators may then test the resistance of test component 106, such as with test system 110 (see FIG. 1). The resistance measurement is taken across first test lead 402 and second test lead 406 by injecting a current into second test lead 406 and measuring a voltage across the test leads 402 and 406. For the resistance measurement, the resistance of second test lead 406 and the resistance of first test lead 402 in essence contribute to the total resistance of test component. The resistance of test MR sensor 404 is insignificant as described below.

Forming test MR sensor 404 to have a large area as shown in FIG. 4 reduces the resistance of test MR sensor 404. The resistance of a thin-film structure, such as test MR sensor 404, equals the area resistance (RA) of test MR sensor 404 divided by the area of test MR sensor 404. Thus, the resistance of test MR sensor 404 is inversely proportional to its area. The larger that the area of test MR sensor 404 is fabricated, the lower the resistance of test MR sensor 404 will be. When the area of test MR sensor 404 is above a particular threshold, such as ten times the area of a typical read element 200, the resistance of test MR sensor 404 becomes insignificant.

For example, assume that the resistance of test MR sensor 404 is fabricated with the dimensions of 3 microns by 3 microns to have an area of 9 microns$^2$. Further assume that the RA of test MR sensor 404 is 2 ohms (which is a typical RA for a TMR sensor). The resistance of test MR sensor 404 would then be about 0.22 ohms. A typical resistance of first test lead 402 and second test lead 406 may be about 3 ohms. Thus, the resistance of test MR sensor 404 having a large area is insignificant compared to the resistance of first and second test leads 402 and 406 (i.e., less than 10% of the combined resistance of first and second test leads 402 and 406). If a resistance measurement is taken across first test lead 402 and second test lead 406, then the resistance of test MR sensor 404 would be insignificant in the total resistance of test component 106.

In comparison to MR sensor 204 in FIG. 2, a typical MR sensor 204 of an actual read element 200 may have the dimensions of 1 micron by 0.1 microns to have an area of 0.1 microns$^2$. If the RA of MR sensor 204 is also 2 ohms, then the resistance of MR sensor 204 would then be about 20 ohms. Thus, if a resistance measurement is taken across first shield 202 and second shield 206, the resistance of MR sensor 204 would be a major contributing factor in the total resistance of read element 200.

Fabricating the test MR sensor 404 with a large area as provided in FIGS. 3-4 in essence takes the resistance of test MR sensor 404 out of the equation for the total resistance of test component 106, as the resistance of test MR sensor 404 is so small. As a result, a total resistance measurement of test component 106 represents the series resistance of first test lead 402 and second test lead 406. Recording head fabricators may advantageously measure the resistance of first test lead 402 and second test lead 406 substantially independent of the resistance of test MR sensor 404. By knowing the resistance of first test lead 402 and second test lead 406 substantially independent of the resistance of test MR sensor 404, recording head fabricators may determine the resistance of an MR sensor independent of the lead resistance, which is described in FIG. 5.

Figure 5:
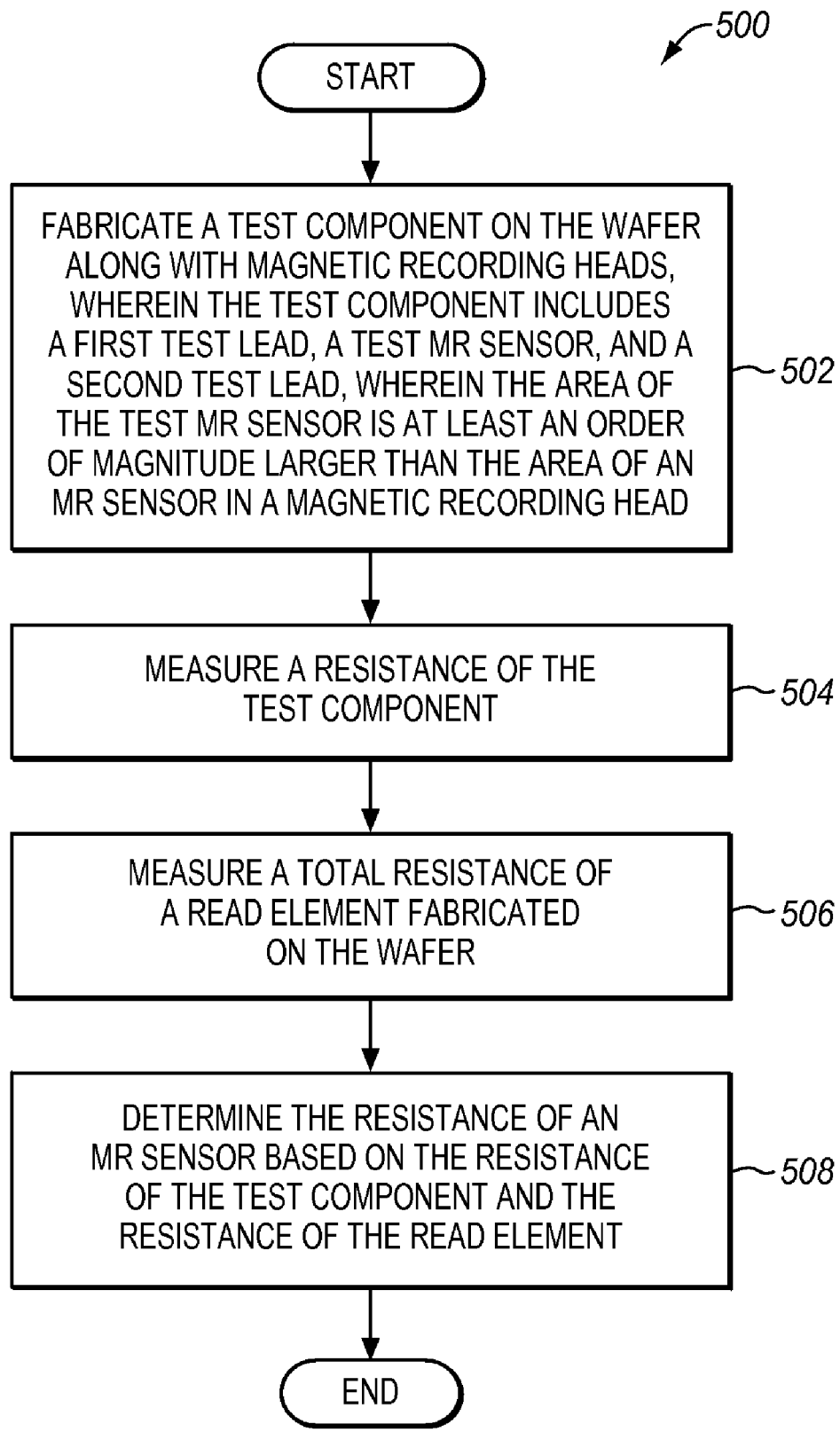
FIG. 5 is a flow chart illustrating a method of determining resistances of MR sensors formed in read elements of magnetic recording heads on a wafer in an exemplary embodiment of the invention.

FIG. 5 is a flow chart illustrating a method 500 of determining resistances of MR sensors formed in read elements of magnetic recording heads on a wafer in an exemplary embodiment of the invention. The steps of the flow chart in FIG. 5 are not all inclusive and may include other steps not shown.

Step 502 comprises fabricating a test component 106 on a wafer 102 along with magnetic recording heads 104 (see FIG. 1). Test component 106 is a fabricated as described in FIGS.

3-4 to include a first test lead, a test MR sensor, and a second test lead, wherein the test MR sensor in test component 106 has a large area.

One assumption is that the same or similar fabrication processes are used to fabricate test components 106 (see FIG. 4) and read elements 200 (see FIG. 2) concurrently on wafer 102. For instance, the same fabrication steps may be used to form first test lead 402 (see FIG. 4) in test component 106 and to form first shield 202 (see FIG. 2) in recording head 200. The same fabrication steps may be used to form test MR sensor 404 (see FIG. 4) in test component 106 and to form MR sensor 204 (see FIG. 2) in recording head 200. Even though the same fabrication steps may be used to form test MR sensor 404 and MR sensor 204, those skilled in the art will appreciate that different photoresist patterns are defined for test components 106 and read elements 200 so that the area of test MR sensor 404 is at least an order of magnitude larger than the area of MR sensor 204. The same fabrication steps may also be used to form second test lead 406 (see FIG. 4) in test component 106 and to form second shield 206 (see FIG. 2) in recording head 200. As a result, no additional processing steps are needed to fabricate test components 106.

Step 504 of FIG. 5 comprises measuring a resistance of test component 106. The resistance measurement is taken across first test lead 402 and second test lead 406, such as by injecting a current into second test lead 406 and measuring a voltage across the test leads 402 and 406 (see FIG. 4). Test system 110 as shown in FIG. 1 may perform the measurement of step 504. Test system 110 may include a four-point probe and associated processing capabilities that is able to measure a resistance.

Step 506 comprises measuring a total resistance of a read element 200 that is fabricated on wafer 102. Measuring the total resistance of a read element 200 may be performed in a variety of ways. As previously described, the magnetic recording heads 104 on wafer 102 (see FIG. 1) are fabricated with read elements 200. Thus, the resistance of one or more of the read elements 200 in magnetic recording heads 104 may be measured, such as with test system 110. Alternatively, one or more test components (not shown) may also be fabricated with a functional read element 200, much like a functional read element 200 is fabricated in magnetic recording heads 104. In such a case, the resistance of a read element 200 in a test component may be measured.

Step 508 comprises determining the resistance of an MR sensor 204 in a magnetic recording head 104 based on the resistance of test component 106, and based on the total resistance of read element 200. Because the resistance of test MR sensor 404 in test component 106 is insignificant due to the large area of test MR sensor 404, the resistance measurement of test component 106 represents the resistance of first test lead 402 and second test lead 206 (see FIG. 2). The total resistance measurement of read element 200 represents the resistance of second shield 206, the resistance of MR sensor 204, and the resistance of first shield 202. Because test leads 402 and 406 in test component 106 are fabricated in the same manner as shields 202 and 206 in read element 200, it may be assumed that their resistances are about equal and that the resistance of test component 106 is approximately equal to the combined resistance of shields 202 and 206. As a result, the resistance of MR element 204 of read element 200 may be determined by subtracting the resistance of test component 106 from the total resistance of read element 200.

Recording head fabricators are advantageously able to determine the resistance of MR sensor 204 independent of the resistance of shields 202 and 206. Those skilled in the art will further appreciate that the resistance measurements may be taken in the presence of a varying external magnetic field to generate transfer curves. By knowing the contribution to resistance by shields 202 and 206, the transfer curves for magnetoresistance (dr/R) and area resistance (RA) for MR sensor 204 may be determined more accurately. Also, the magnetoresistance (dr/R) of shields 202 and 206 is taken out of account.

Figure 6:
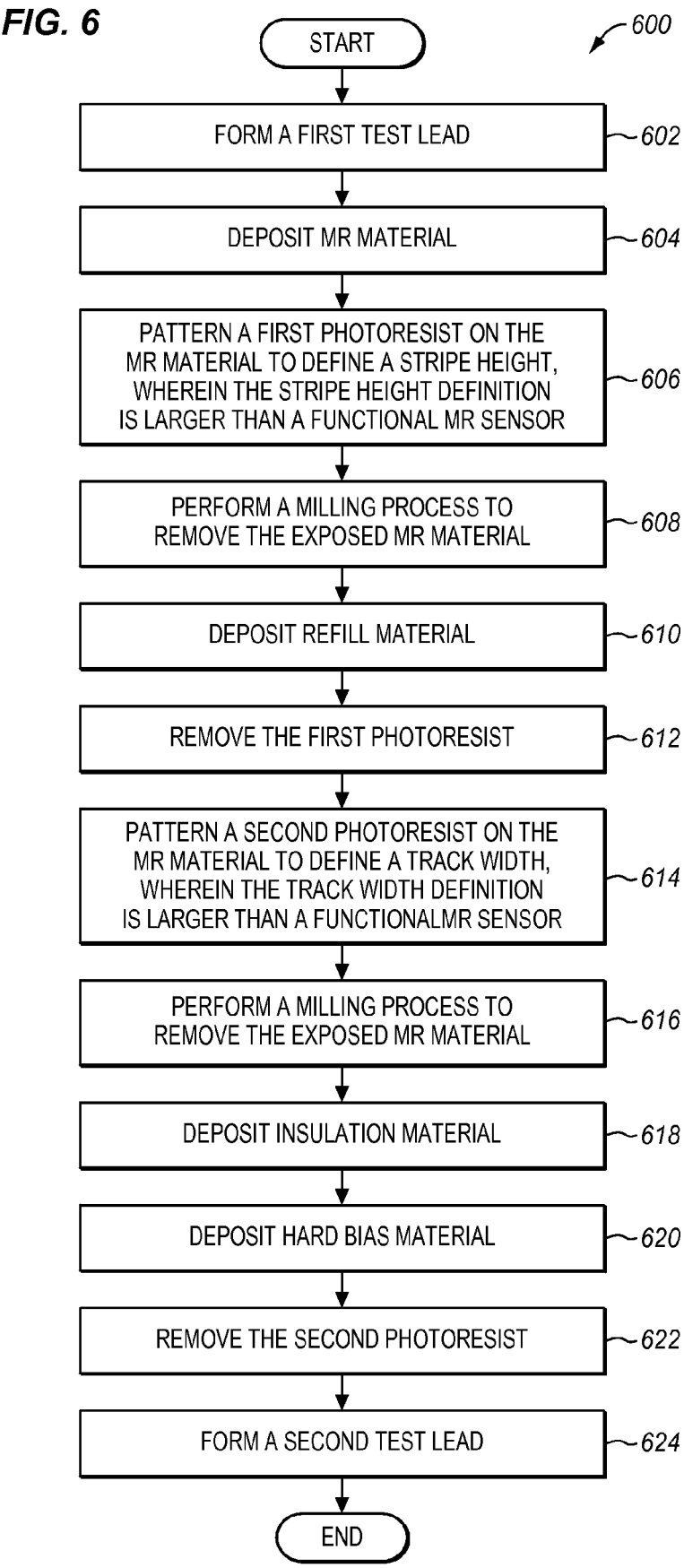
FIG. 6 is a flow chart illustrating a method of fabricating a test component in an exemplary embodiment of the invention.

FIG. 6 is a flow chart illustrating a method 600 of fabricating test component 106 in an exemplary embodiment of the invention. The odd numbered figures for FIGS. 7-30 illustrate the results of the steps of method 600 to fabricate test component 106 in exemplary embodiments of the invention. The even numbered figures for FIGS. 7-30 illustrate the results of the steps to fabricate a functional read element, so that the differences between fabricating a test component and a read element are clearly shown. Method 600 is just one example of how to fabricate test component 106, as other methods may be performed in other embodiments to fabricate test component 106.

Figure 7:
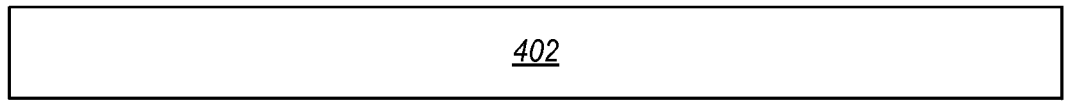
FIG. 7 is a cross-sectional view of a test component with a first test lead formed according to the method of FIG. 6 in an exemplary embodiment of the invention.
Figure 8:
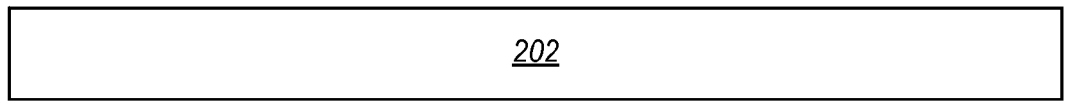
FIG. 8 is a cross-sectional view of a read element with a first shield formed.

Step 602 comprises forming a first test lead 402 (see also FIG. 4). FIG. 7 is a cross-sectional view of test component 106 with first test lead 402 formed according to step 602. First test lead 402 may be formed by depositing electrically conductive material, such as NiFe, full-film on a substrate (not shown) and planarizing the top surface of the conductive material. Because test component 106 is being fabricated in full-film processing steps, first test lead 402 is formed in the same processing steps of first shield 202 of read element 200 (see FIG. 2), and thus is comprised of the same conductive material as a shield in a read element. FIG. 8 is a cross-sectional view of read element 200 with first shield 202 formed, which corresponds with first test lead 402 in FIG. 7.

Figure 9:
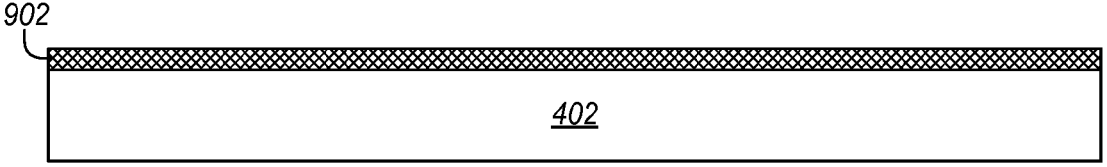
FIG. 9 is a cross-sectional view of the test component with MR material deposited according to the method of FIG. 6 in an exemplary embodiment of the invention.
Figure 10:
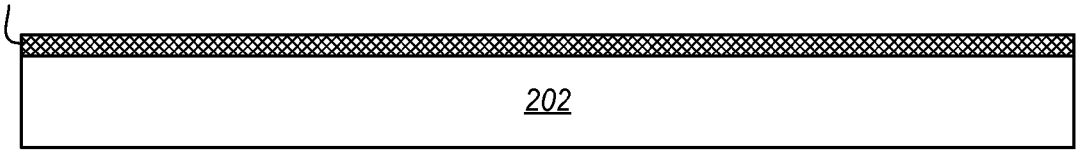
FIG. 10 is a cross-sectional view of the read element with MR material deposited.

Step 604 of FIG. 6 comprises depositing magnetoresistance (MR) material. Depositing MR material is a multi-layer deposition process for depositing a pinning layer, a pinned layer, a spacer/barrier layer, a free layer, etc. FIG. 9 is a cross-sectional view of test component 106 with MR material 902 deposited according to step 604. FIG. 10 is a cross-sectional view of read element 200 with MR material 1002 deposited.

Figure 11:
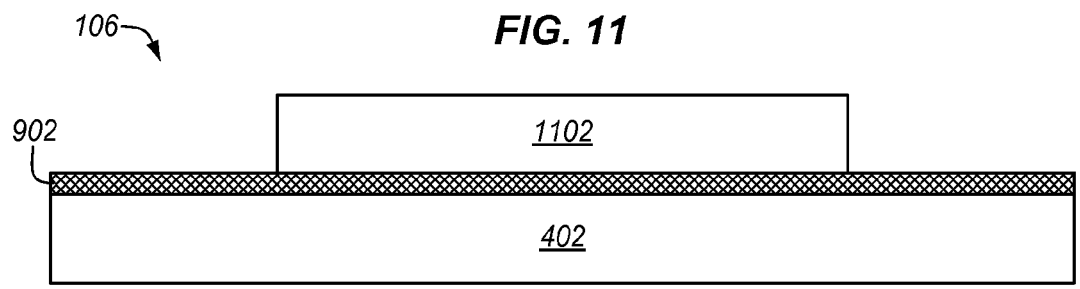
FIG. 11 is a cross-sectional view of the test component with a first photoresist patterned according to the method of FIG. 6 in an exemplary embodiment of the invention.
Figure 12:
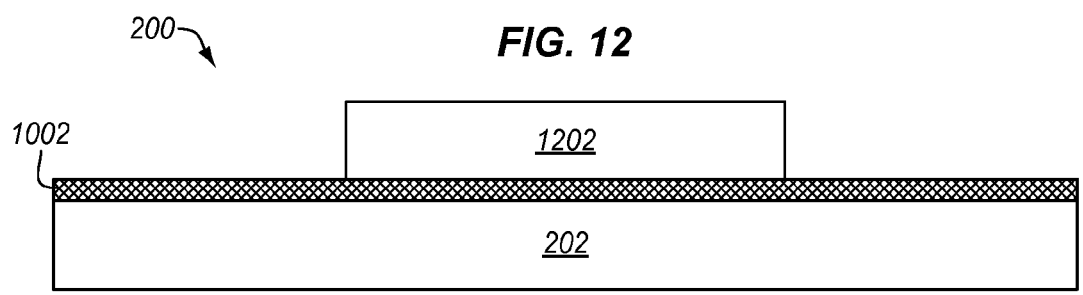
FIG. 12 is a cross-sectional view of the read element with a first photoresist patterned.

Step 606 of FIG. 6 comprises patterning a first photoresist on MR material 902 to define a stripe height of an MR sensor. FIG. 11 is a cross-sectional view of test component 106 with first photoresist 1102 patterned according to step 606. Photoresist 1102 may be patterned so that the stripe height of the MR sensor in test component 106 is larger than in a functional read element. For example, the stripe height of an MR sensor in a functional read element, such as read element 200, may be about 1 micron (at wafer level before any row-level lapping). Thus, photoresist 1102 may be patterned larger than an actual read element 200 so that the stripe height of the MR sensor is larger than 1 micron. FIG. 12 is a cross-sectional view of read element 200 with a first photoresist 1202 patterned. As is evident in FIGS. 11-12, photoresist 1102 in FIG. 11 is wider than photoresist 1202 in FIG. 12.

Figure 13:
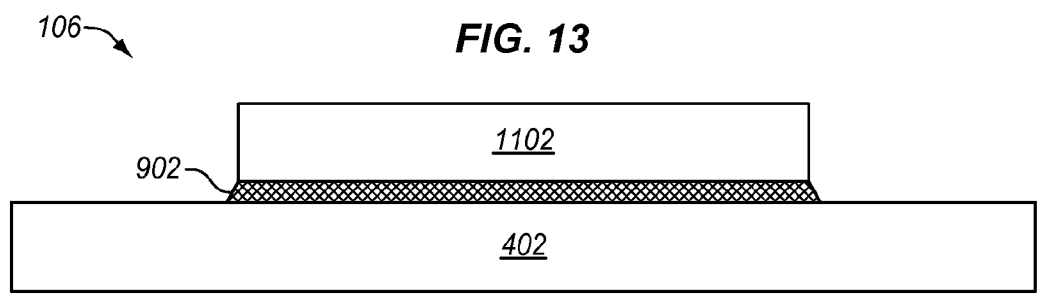
FIG. 13 is a cross-sectional view of the test component after a milling process of the method of FIG. 6 in an exemplary embodiment of the invention.
Figure 14:
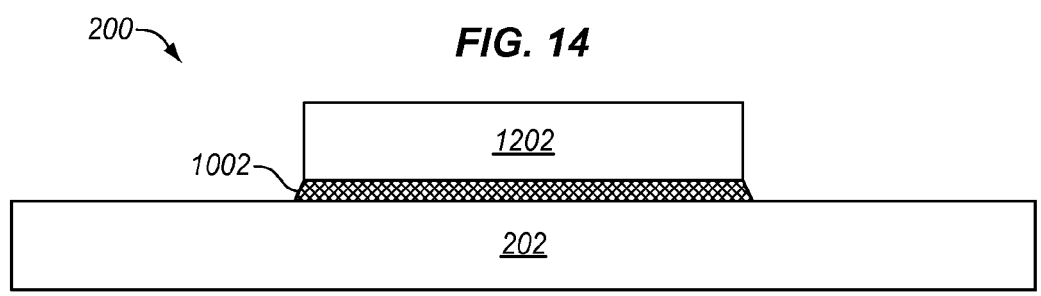
FIG. 14 is a cross-sectional view of the read element after a milling process removes MR material exposed by a photoresist.

Step 608 of FIG. 6 comprises performing a milling process, or another type of removal process, to remove the MR material 902 exposed by photoresist 1102. FIG. 13 is a cross-sectional view of test component 106 after the milling process of step 608. FIG. 14 is a cross-sectional view of read element 200 after the milling process removes the MR material 1002 exposed by photoresist 1202.

Figure 15:
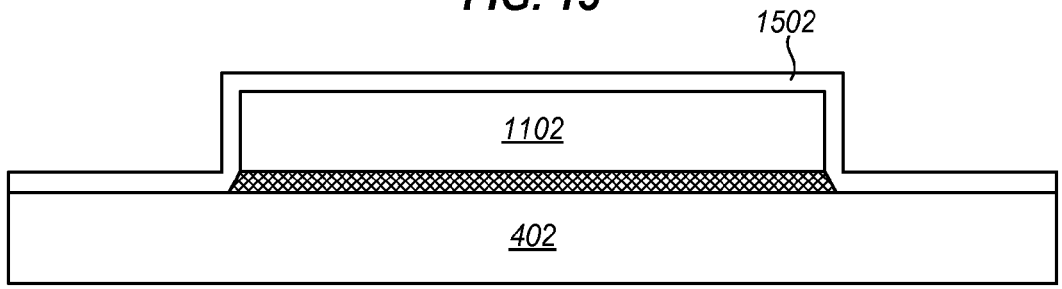
FIG. 15 is a cross-sectional view of the test component with refill material deposited according to the method of FIG. 6 in an exemplary embodiment of the invention.
Figure 16:
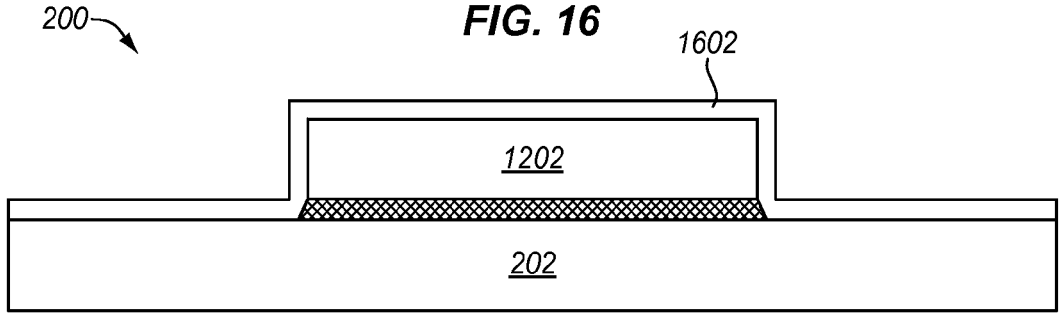
FIG. 16 is a cross-sectional view of the read element with refill material deposited.

Step 610 of FIG. 6 comprises depositing refill material. Refill material comprises some type of insulating material, such as alumina. FIG. 15 is a cross-sectional view of test component 106 with refill material 1502 deposited according to step 610. FIG. 16 is a cross-sectional view of read element 200 with refill material 1602 deposited.

Figure 17:
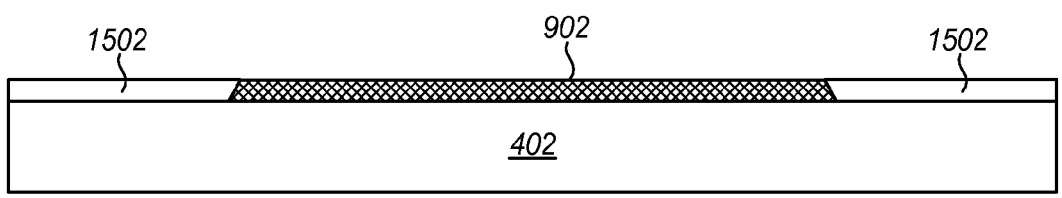
FIG. 17 is a cross-sectional view of the test component with the first photoresist removed according to the method of FIG. 6 in an exemplary embodiment of the invention.
Figure 18:
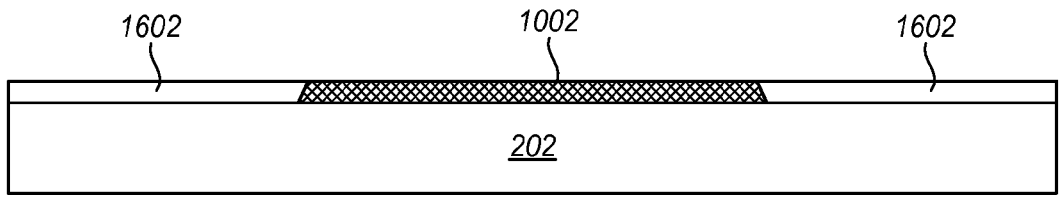
FIG. 18 is a cross-sectional view of the read element with the first photoresist removed.

Step 612 of FIG. 6 comprises removing the first photoresist 1102. Photoresist 1102 may be removed with a Chemical Mechanical Polishing (CMP) assisted lift-off process. FIG. 17 is a cross-sectional view of test component 106 with photoresist 1102 removed according to step 612. The removal of photoresist 1102 also removes the refill material deposited on top of photoresist 1102, which exposes MR material 902. FIG. 18 is a cross-sectional view of read element 200 with photoresist 1202 removed.

Figure 19:
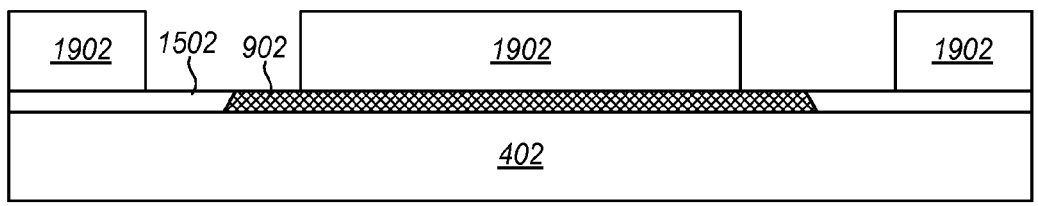
FIG. 19 is a cross-sectional view of the test component with a second photoresist patterned according to the method of FIG. 6 in an exemplary embodiment of the invention.
Figure 20:
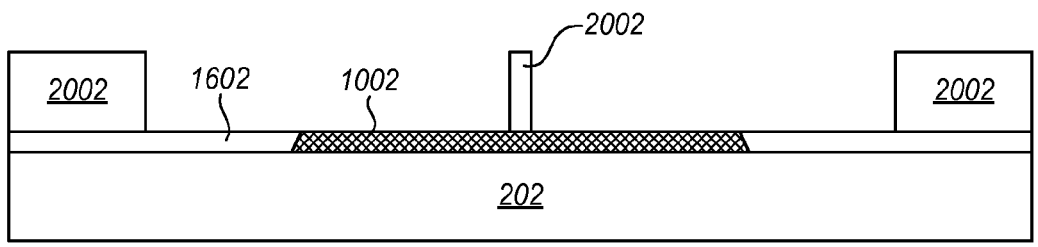
FIG. 20 is a cross-sectional view of the read element with a second photoresist patterned.

Step 614 of FIG. 6 comprises patterning a second photoresist to define a track width of an MR sensor. FIG. 19 is a cross-sectional view of test component 106 with a second photoresist 1902 patterned according to step 614. Photoresist 1902 may be patterned so that the track width of the test MR sensor in test component 106 is larger than in a functional read element. For example, the track width of an MR sensor in a functional read element, such as read element 200, may be about 0.1 microns. Thus, photoresist 1902 may be patterned larger (i.e., 1 micron or more) than read element 200 so that the track width of the test MR sensor is at least an order of magnitude larger than 0.1 microns. FIG. 20 is a cross-sectional view of read element 200 with a second photoresist 2002 patterned. As is evident in FIGS. 19-20, photoresist 1902 in FIG. 19 is much wider than photoresist 2002 in FIG. 20.

Figure 21:
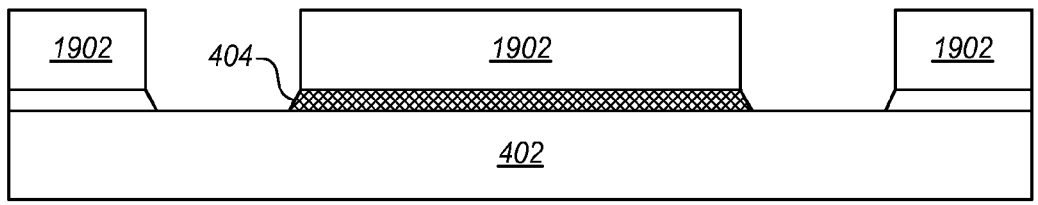
FIG. 21 is a cross-sectional view of the test component after the milling process of the method of FIG. 6 in an exemplary embodiment of the invention.
Figure 22:
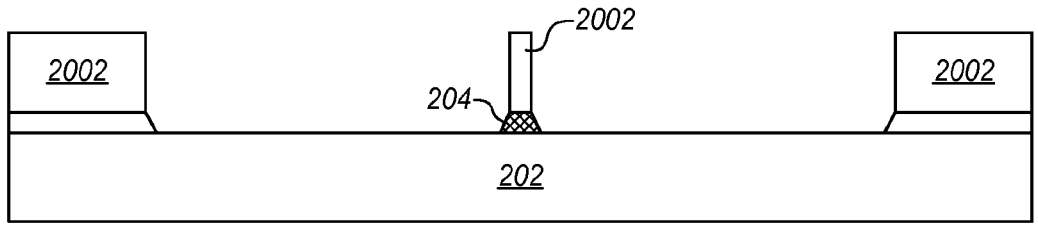
FIG. 22 is a cross-sectional view of the read element after the milling process.

Step 616 of FIG. 6 comprises performing a milling process, or another type of removal process, to remove the MR material 902 exposed by photoresist 1902. FIG. 21 is a cross-sectional view of test component 106 after the milling process of step 616. After the milling process, test MR sensor 404 is defined in test component 106 from the MR material 902. FIG. 22 is a cross-sectional view of read element 200 after the milling process. After the milling process, MR sensor 204 is defined in read element 200 from the MR material 1002. Test MR sensor 404 in FIG. 21 is fabricated such that the area of test MR sensor 404 is at least an order of magnitude larger than the area of MR sensor 204 in FIG. 22. For instance, the area of test MR sensor 404 may be at least 10 times larger, 100 times larger, etc, than the area of MR sensor 202.

Figure 23:
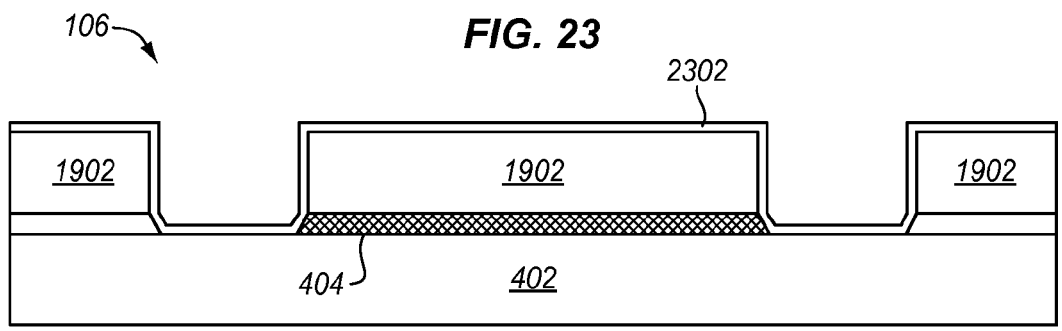
FIG. 23 is a cross-sectional view of the test component with insulation material deposited according to the method of FIG. 6 in an exemplary embodiment of the invention.
Figure 24:
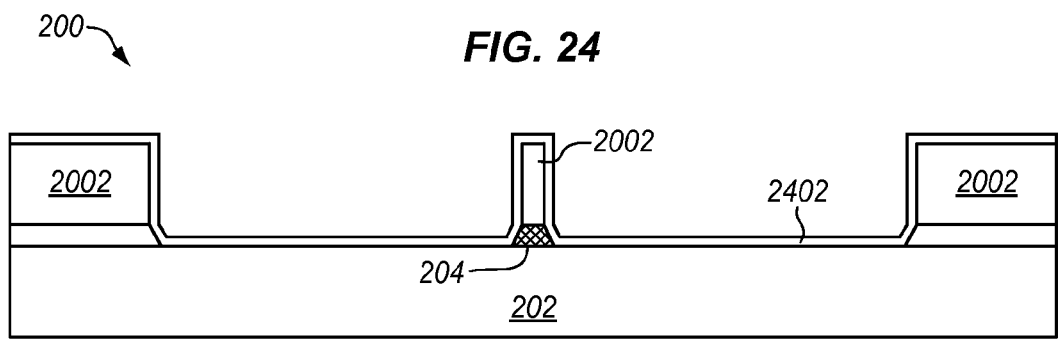
FIG. 24 is a cross-sectional view of the read element with insulation material deposited.

Step 618 of FIG. 6 comprises depositing insulation material, such as alumina. FIG. 23 is a cross-sectional view of test component 106 with insulation material 2302 deposited according to step 618. FIG. 24 is a cross-sectional view of read element 200 with insulation material 2402 deposited.

Figure 25:
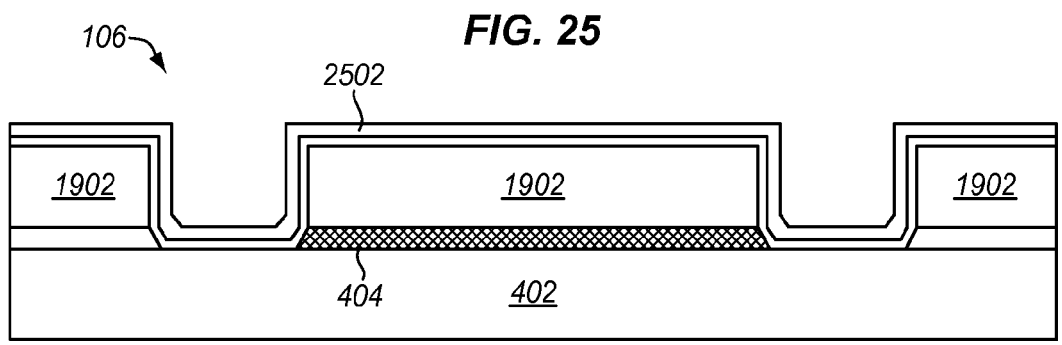
FIG. 25 is a cross-sectional view of the test component with hard bias material deposited according to the method of FIG. 6 in an exemplary embodiment of the invention.
Figure 26:
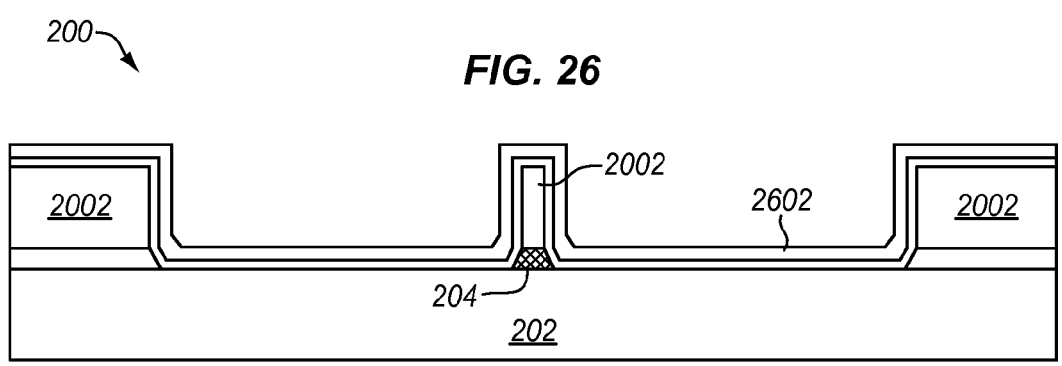
FIG. 26 is a cross-sectional view of the read element with hard bias material deposited.

Step 620 of FIG. 6 comprises depositing hard bias material. The hard bias material is used to form hard-bias magnets on either side of test MR sensor 404. The hard-bias magnets may not be formed in test component 106 in some embodiments. The hard-bias magnets are adapted to bias the free layer (not shown) on test MR sensor 404, and may also magnetically interact with first test lead 402 and second test lead 406, so forming the hard-bias magnets may give a more accurate resistance measurement in test component 106. FIG. 25 is a cross-sectional view of test component 106 with hard bias material 2502 deposited according to step 620. FIG. 26 is a cross-sectional view of read element 200 with hard bias material 2602 deposited.

Figure 27:
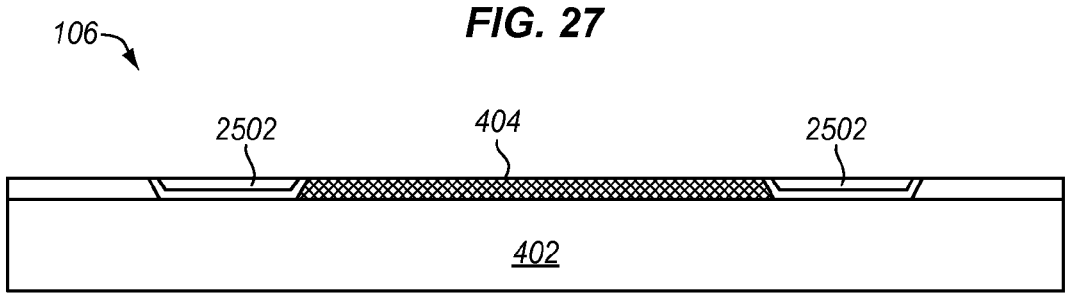
FIG. 27 is a cross-sectional view of the test component with the second photoresist removed according to the method of FIG. 6 in an exemplary embodiment of the invention.
Figure 26:
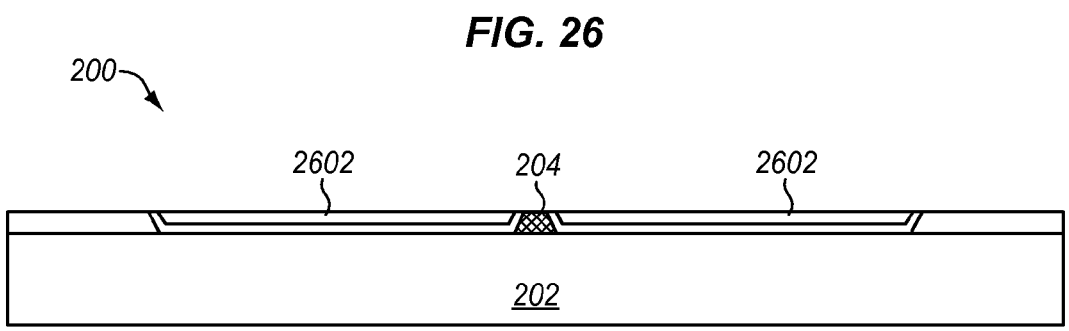

Step 622 of FIG. 6 comprises removing the second photoresist 1902. Photoresist 1902 may be removed with a CMP process. FIG. 27 is a cross-sectional view of test component 106 with photoresist 1902 removed according to step 622. FIG. 28 is a cross-sectional view of read element 200 with photoresist 2002 removed.

Figure 29:
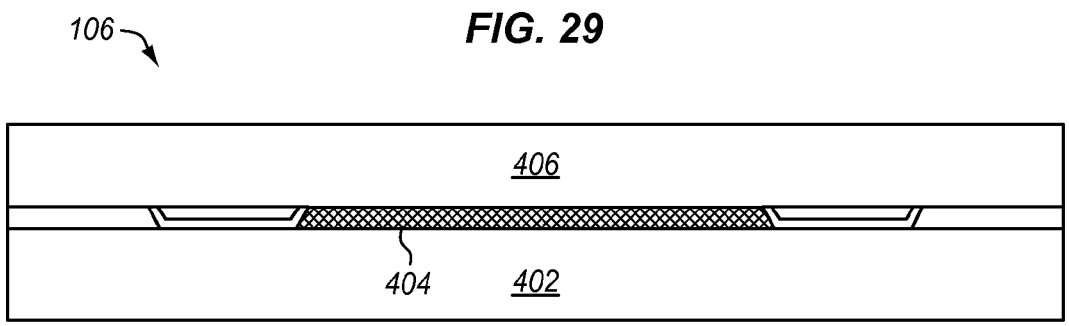
FIG. 29 is a cross-sectional view of the test component with a second test lead formed according to the method of FIG. 6 in an exemplary embodiment of the invention.
Figure 30:
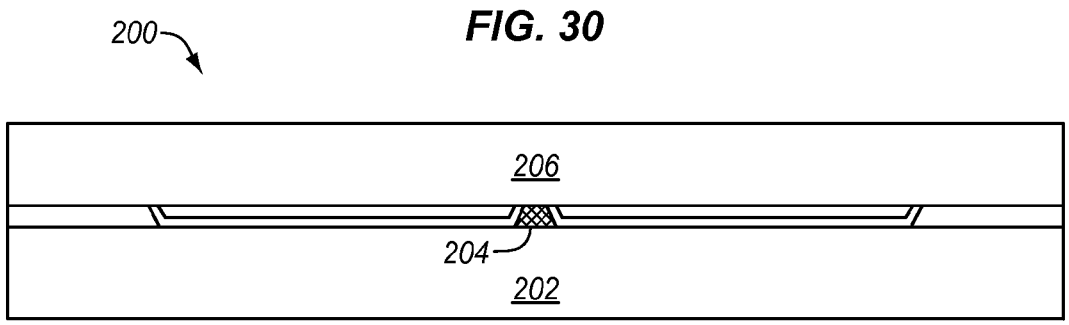
FIG. 30 is a cross-sectional view of the read element with a second shield formed.

Step 624 comprises forming second test lead 406. FIG. 29 is a cross-sectional view of test component 106 with second test lead 406 formed according to step 622. Because test component 106 is being fabricated in full-film processing steps, second test lead 406 is formed in the same processing steps of second shield 206 of read element 200, and thus is comprised of the same conductive material as a shield in a read element. FIG. 30 is a cross-sectional view of read element 200 with second shield 206 formed.

FIG. 29 thus shows the fabricated test component 106 just as shown in FIG. 4. Similarly, FIG. 30 shows the fabricated read element 200 just as shown in FIG. 2. Test component 106 and read element 200 may then be measured as described in FIG. 5 to obtain the resistance of test component 106 and the resistance of read element 200. If the resistance of test component 106 is subtracted from the resistance of read element 200, then the resistance of MR sensor 204 in read element 200 may be determined as described in FIG. 5.

Although specific embodiments were described herein, the scope of the invention is not limited to those specific embodiments. The scope of the invention is defined by the following claims and any equivalents thereof.

We claim:

1. A method of testing resistances of magnetoresistance (MR) sensors in read elements of magnetic recording heads on a wafer, the method comprising:
   fabricating a test component on the wafer along with the magnetic recording heads, wherein the test component includes a first test lead, a second test lead, and a test MR sensor connected between the first test lead and the second test lead, wherein the area of the test MR sensor is at least an order of magnitude larger than the area of the MR sensors in the magnetic recording heads;
   measuring a resistance of the test component;
   measuring a total resistance of a read element fabricated on the wafer; and
   determining the resistance of an MR sensor in a magnetic recording head on the wafer based on the resistance of the test component and the total resistance of the read element.

2. The method of claim 1 wherein measuring a resistance of the test component comprises:
   applying a varying magnetic field; and
   measuring a transfer curve of the resistance of the test component based on the varying magnetic field.

3. The method of claim 2 wherein measuring a total resistance of a read element fabricated on the wafer comprises:
   measuring a transfer curve of the resistance of the read element based on the varying magnetic field.

4. The method of claim 3 wherein determining the resistance of an MR element in a magnetic recording head comprises:
   determining a transfer curve of the resistance of the MR element in the magnetic recording head based on the transfer curve of the resistance of the test component and the transfer curve of the resistance of the read element.

5. The method of claim 1 wherein a plurality of test components are staggered throughout the wafer.

6. The method of claim 1 wherein measuring a total resistance of a read element fabricated on the wafer comprises:
   measuring a total resistance of a read element that is fabricated in a magnetic recording head on the wafer.

7. The method of claim 1 wherein measuring a total resistance of a read element fabricated on the wafer comprises:
   measuring a total resistance of a read element that is fabricated in another test component on the wafer.

8. The method of claim 1 wherein fabricating a test component on the wafer comprises:
   forming the first test lead;

forming the test MR sensor connected to the first test lead that has the area at least an order of magnitude larger than the area of the MR sensors in the magnetic recording heads; and forming the second test lead connected to the test MR sensor.

9. The method of claim 1:

wherein the test MR sensor has an area large enough that the resistance of the test MR sensor is less than about 10% of the combined resistance of the first test lead and the second test lead.

* * * * *

UNITED STATES PATENT AND TRADEMARK OFFICE
CERTIFICATE OF CORRECTION

| | | |
|---|---|---|
| PATENT NO. | : 7,855,553 B2 | Page 1 of 1 |
| APPLICATION NO. | : 11/965587 | |
| DATED | : December 21, 2010 | |
| INVENTOR(S) | : Beach et al. | |

It is certified that error appears in the above-identified patent and that said Letters Patent is hereby corrected as shown below:

Title Page,
Item (57) in Abstract, line 7, the text "on tie wafer" should read "on the wafer".

Signed and Sealed this
Eighth Day of February, 2011

David J. Kappos
*Director of the United States Patent and Trademark Office*